(12) United States Patent
Innes

(10) Patent No.: US 6,368,548 B1
(45) Date of Patent: Apr. 9, 2002

(54) DIRECT SMELTING PROCESS AND APPARATUS

(75) Inventor: John Alexander Innes, Kew (AU)

(73) Assignee: Technological Resources Pty. Ltd., Melbourne (AU)

( * ) Notice: Subject to any disclaimer, the term of this patent is extended or adjusted under 35 U.S.C. 154(b) by 0 days.

(21) Appl. No.: 09/585,603

(22) Filed: Jun. 2, 2000

(30) Foreign Application Priority Data

Jun. 4, 1999 (AU) .................................................. 0763

(51) Int. Cl.[7] .............................................. C21B 11/00
(52) U.S. Cl. .......................... 266/171; 75/500; 75/501; 75/502
(58) Field of Search .......................... 75/500, 501, 502; 266/171, 172

(56) References Cited

U.S. PATENT DOCUMENTS 6,143,054 A * 11/2000 Dry .............................. 75/500

FOREIGN PATENT DOCUMENTS

WO        WO 99/16911        *  4/1999

* cited by examiner

*Primary Examiner*—Scott Kastler
(74) *Attorney, Agent, or Firm*—Miles & Stockbridge P.C.; John C. Kerins

(57) ABSTRACT

A direct smelting process for producing metals from metalliferous feed material is disclosed. The process includes forming a molten bath having a metal layer and a slag layer on the metal layer and smelting injected metalliferous feed material in the metal layer. The process also includes generating an upward gas flow from the metal layer which entrains molten material that is in the metal layer and carries the molten material into the slay layer and forms a region of turbulence at least at the interface of the slag layer and the metal layer. The process also includes injecting a gas into the slag layer via a plurality of lances/tuyeres and generating turbulence in an upper region of the slag layer and projecting splashes, droplets and streams of molten material from the slag layer into a top space of the vessel that is above the slag layer.

16 Claims, 1 Drawing Sheet

DIRECT SMELTING PROCESS AND APPARATUS

BACKGROUND OF THE INVENTION

1. Field of the Invention

The present invention relates to a process and apparatus for producing molten metal (which term includes metal alloys), in particular although by no means exclusively iron, from metalliferous feed material, such as ores, partly reduced ores and metal-containing waste streams, in a metallurgical vessel containing a molten bath.

The present invention relates particularly to a molten metal bath-based direct smelting process and apparatus for producing molten metal from a metalliferous feed material.

2. Description of Related Arts

The most widely used process for producing molten iron is based on the use of a blast furnace. Solid material is charged into the top of the furnace and molten iron is tapped from the hearth. The solid material includes iron ore (in sinter, lump or pellet form), coke, and fluxes and forms a permeable burden that moves downwardly. Preheated air, which may be oxygen enriched, is injected into the bottom of the furnace and moves upwardly through the permeable bed and generates carbon monoxide and heat by combustion of coke. The result of these reactions is to produce molten iron and slag.

A process that produces iron by reduction of iron ore below the melting point of the iron produced is generally classified as a "direct reduction process" and the product is referred to as DRI.

The FIOR (Fluid Iron Ore Reduction) process is an example of direct reduction process. The process reduces iron ore fines as the fines are gravity-fed through each reactor in a series of fluid bed reactors. The fines are reduced in solid state by compressed reducing gas that enters the bottom of the lowest reactor in the series and flows counter-current to the downward movement of fines.

Other direct reduction processes include moving shaft furnace-based processes, static shaft furnace-based processes, rotary hearth-based processes, rotary kiln-based processes, and retort-based processes.

The COREK process includes a direct reduction process as one stage. The COREX process produces molten iron directly from coal without the large requirements for coal, as a blast furnace. The COREX process includes 2-stage operation in which:

(a) DRI is produced in a shaft furnace from a permeable bed of iron ore (in lump or pellet form), coal and flexes; and (b) the DRI is then charged without cooling into a connected meltor gasifier and melted.

Partial combustion of coal in the melter gasifier produces reducing gas for the shaft furnace.

Another known group of processes for producing iron is based on cyclone converters in which iron ore is melted by combustion of oxygen and reducing gas in an upper melting cyclone and is smelted in a lower smelter generates the reducing gas for the upper melting cyclone.

A process that produces molten metal directly from ores (and partially reduced ores) is generally referred to as a "direct smelting process".

One known group of direct smelting processes is based on the use of electric furnaces as the major source of energy for the smelting reactions.

Another known direct smelting process, which is generally referred to as the Romelt process, is described in Australian patent 604237 in the name of Moskovsky Institut Statis Splavov. The Romelt process is based on the use of a large volume, highly agitated slag bath as the medium for smelting top-charged metal oxides to metal and for post-combusting gaseous reaction products and transferring the heat as required in continue smelting metal oxides. The Romelt process includes injection of oxygen enriched air or oxygen into the size via a lower row of tuyeres to provide slag agitation and injection of oxygen intothe also via an upper row of tuyeres to promote post-combustion. The slag volume above the lower row of tuyeres forms an "upper bubbling zone" and the slag volume below the lower row of tuyeres forms a "quiescent slag melt zone". The upper bubbling zone is the main reaction medium, and molten metal droplets that form in this slag volume move downwardly by gravity through the quiescent slag melt zone and collect in a metal layer. In the Romelt process the metal layer is not an important reaction medium.

Another known group of direct smelting process that are slag-based is generally described as "deep slag" processes. These processes, such as DIOS and AISI processes, are based on forming a deep layer of foaming slag. As with the Romelt process, the metal layer below the slag layer is not an important reaction medium.

Another known direct smelting process which relies on a molten metal layer as a reaction medium, and is generally referred to as the HIsmelt process, is described in International application PCT/AU96/00197 (WO 96/31627) in the name of the applicant.

The HIsmelt process as described in the International application comprises:

(a) forming a bath of molten iron and slag in a vessel;

(b) injection into the bath;
  (i) a metalliferous feed material, typically metal oxides; and
  (ii) a solid carbonaceous material, typically coal, which acts as a reductant of the metal oxides and a source of energy; and (c) smelting the metalliferous feed material to metal in the metal layer.

The HIsmelt process also comprises post-combusting reaction gases, such as CO and $H_1$, released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there are ascending and thereafter descending droplets or splashes or streams of molten metal and/or slag which provide an effective medium to transfer to the bath the thermal energy generated by post-combusting reaction gases above the bath.

SUMMARY OF THE INVENTION

The applicant has carried out extensive pilot plant work on the HIsmelt process and has made a series of significant findings in relation to the process.

In general terms, the present invention is a direct smelting process for producing metals from metalliferous feed material which includes the steps of:

(a) forming a molten bath having a metal layer (as described herein) and a slag layer (as described herein) on the metal layer in a metallurgical vessel;

(b) injecting metalliferous feed material and solid carbonaceous material with a carrier gas into the molten bath via a plurality of lances/tuyeres and smelting metalliferous material to metal in the metal layer;

(c) generating an upward gas flow from the metal layer which entrains molten material that is in the metal layer and carries the molten material into the slag layer and forms a region of turbulence at least at the interface of the slag layer and the metal layer; and (d) injecting a gas into the slag layer via a plurality of lances/tuyeres and:
  (i) generating turbulence in an upper region of the slag layer; and
  (ii) projecting splashes, droplets and streams of molten material from the slag layer into a top space of the vessel that is above the slag layer; and (e) post combusting reaction gases in the top space and/or in the upper region of the slag layer.

A fundamental difference between and advantage of the process of the present invention and known non-HIsmelt direct smelting processes is that in the process of the present invention the main smelting region is the metal layer and the main oxidation (ie heat generation) region is well above the metal layer and these regions are spatially well separated and heat transfer is via physical movement and interaction of molten material between the two regions.

The process of the present invention generates two regions of turbulence, one at the metal layer/slag layer interface and the other in an upper region of the slag layer. Preferably the regions of turbulence are regions of high turbulence.

DETAILED DESCRIPTION OF THE PREFERRED EMBODIMENTS

Figure 1:
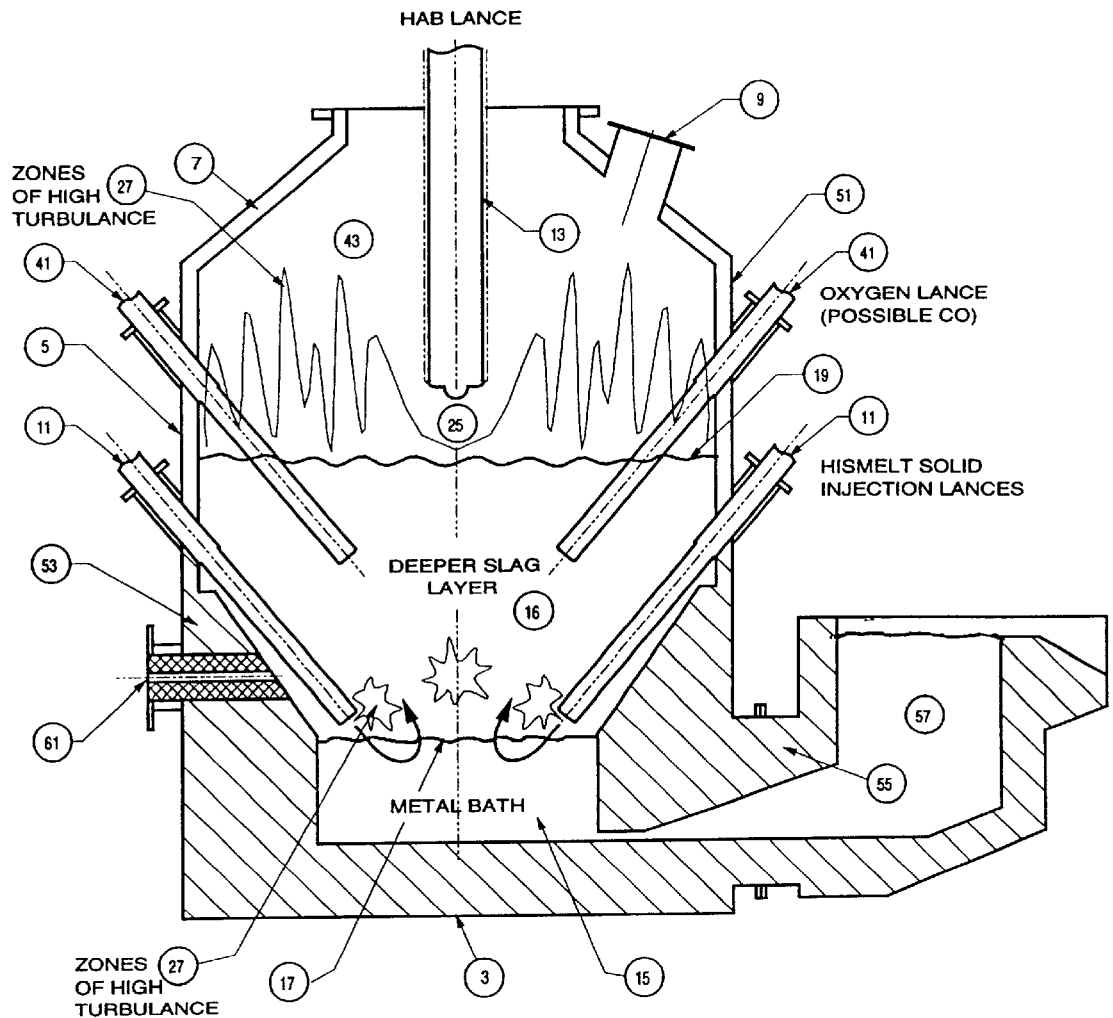
FIG. 1 is a vertical section through a metallurgical vessel illustrating, in substantially schematic form, a preferred embodiment of the present invention.

The process of the present invention applies particularly, although not exclusively, to situations in which it is possible that upward gas flow from the metal layer would have insufficient moment to generate sufficient turbulence in the upper region to achieve the desirable objectives of projecting splashes, droplets and streams of molten material from the slag layer into the top space;

(a) to wet adequately the side walls and roof of the vessel that are in the region of the top space of the vessel; and
(b) to capture the energy released during post combustion in the top space.

Such situation are likely to arise when there are deep layers of slag and/or when the process generates relatively low gas flow rates from the metal layer.

In such situations, gas injection into the slag layer contributes to generating the required levels of turbulence or of itself generates the required levels of turbulence.

Preferably the region of turbulence at the interface of the slag layer and the metal layer is a metal-rich region compared to other regions of the slag layer.

Typically, molten metal is a major part and molten slag is a minor part of the molten material that is carried from the metal layer into the slag layer in step (c).

Preferably the region of turbulence in the upper region of the slag layer is a slag rich region compared to the region of turbulence at the interface of the slag layer and the metal layer.

Typically, molten slag is a major part and molten metal is a minor part of the splashes, droplets and streams of molten material projected from the slag layer in step (d).

The upward gas flow from the metal layer in step (c) may be caused by any one or more of a number of factors. For example, gas flow may be generated at least in part as a result of injection of metalliferous feed material and solid carbonaceous material into the metal layer. By way of further example, the gas flow may be generated at least in part as a result of injection of the carrier gas into the metal layer with injected metalliferous feed material and/or solid carbonaceous material. By way of further example, gas flow may be generated at least in part as a result of bottom and/or side wall injection of a gas into the metal layer.

Preferably, the upward gas flow from the metal layer in step (c) is generated by injecting metalliferous feed material and carbonaceous material and the carrier gas towards and thereafter into the metal layer.

The injection of solid material and carrier gas towards and thereafter into the metal layer has the following consequences.

Firstly, the momentum of the injected solid material/carrier gas causes the solid material and gas to penetrate the metal layer.

Secondly, the carbonaceous material, typically coal, is devolatilised and thereby produces gas in the metal layer.

Thirdly, carbon predominantly dissolves into the metal and partially remains as undissolved solids.

Fourthly, the metalliferous material is smelted to metal by carbon derived from injected carbon as described above in item (c) and the smelting reaction generates carbon monoxide gas.

Finally, the gases transported into the metal layer and generated via devolatilisation and smelting produce significant buoyancy uplift of molten metal, undissolved carbon and slag (which is drawn into the metal layer as a consequence of solid/gas injection) from the metal layer which results in upward movement of molten material, and this molten material entrance further slag as it moves upwardly into the slag layer.

Preferably, at least 80 wt % of the metalliferous feed material supplied to the process is injected into the metal layer.

Preferably the gas flow rate generated in step (c) is a least 0.04 $Nm^3/s/m^2$ area of the metal layer and the slag layer (under quiescent conditions).

It is particularly preferred that the gas flow rate be at least 0.2 $Nm^3/s/m^2$.

Preferably the gas that is injected into the slap layer is step (d) is an oxygen containing gas.

Alternatively, or in addition, the gas may be an inert gas, such as nitrogen.

Alternatively, or in addition, the gas may be an off-gas released from the vessel. The off-gas may be treated, for example, by gas reforming or partial combustion, prior to being injected into the slag layer.

Preferably step (d) includes injecting a carbonaceous material and an oxygen-containing gas into the slag layer. This has the consequence of increasing gas evolution and thereby high turbulence in an upper region of the slag layer.

Preferably the process further includes injecting an oxygen-containing gas into the top space via one or more than one lance/tuyere. This gas is a source of oxygen for post combusting reaction gases in the top space in accordance with step (e).

Preferably the location and operating parameters of the one or more than one lance/tuyers that injects the oxygen-containing gas into the top space are selected so that:

(a) the oxygen-containing gas is injected towards the slap layer; and (b) the stream of oxygen-containing gas deflects the upwardly projected splashes, droplets and streams of molten material (generated by gases in the bath) around the lower section of the or each lance/tuyers and a gas continuous space described as a "free space" forms around the end of the or each lance/tuyere.

The formation of the free space is an important feature because it makes it possible for reaction gases in the top space of the vessel to be drawn into the region of the end of the or each lance/tuyere and to be post-combusted in the region. In this context, the term "free space" is understood to mean a space which contains practically no metal and slag.

In addition, the above-described deflection of molten material shields to some degree the side walls of the vessel from the combustion zone generated at the end of the or each lance/tuyers. Also it provides a means for returning more energy back to the bath from gases post combusted in the top space.

The term "smelting" is understood herein to mean thermal processing wherein chemical reactions that reduces metal oxides take place to produce liquid metal.

The term "metal layer" is understood herein to mean that region of the bath that is predominantly metal. Specifically, the term covers a region or zone that includes a dispersion of molten slag in a metal continuous volume.

The term "slap layers" is understood herein to mean that region of the bath that is predominantly slag. Specifically, the term covers a region or zone that including a dispersion of molten metal in a slag continuous volume.

Preferably the process operates at high levels, is at least 40%, of primary post-combustion, where primary post-combustion is defined as:

$$\frac{[CO_2] + [H_2O]}{[CO_2] + [H_2O] + [CO] + [H_2]}$$

wherein:
[CO$_3$]=volume % of CO$_3$ in off-gas:
[H$_2$O]=volume % of H$_2$O is off-gas;
[CD]=volume % of CO in off-gas; and
[H$_2$]=volume % of H$_2$ in off-gas;

More particularly, the term "primary post-combustion" also means the post-combustion which results from the smelting process in the absence of any addition of supplementary carbonaceous material for other purposes.

Preferably the process operates at a primary post-combustion greater than 50%, more preferably greater than 70%.

Preferably the process of the present invention maintains a relatively high slag inventory and uses the amount of slag as a means of controlling the process. Further, it is necessary to maintain a high slag inventory to ensure the oxygen injection into the slag layer does not reach the metal layer.

The term "relatively high slag inventory" is used herein in the context of the amount of slag compared to the amount of metal.

Preferably, when the process is operating under stable conditions, the weight ratio of metal:slag is between 4:1 and 1:2.

More preferably the weight ratio of metal:slag is between 3:1 and 1:1.

It is preferred particularly that the metal:slag weight ratio be between 3:1 and 2:1.

The relatively low heat transfer characteristics of slag is important in the context the minimising heat loss from the slag layer via the side walls of the vessel.

Moreover, by appropriate process control, slag can form an enhanced frozen layer or layers on the side walls and thereby add further resistance to heat loss via the side walls. Therefore, by changing the slag inventory it is possible to increase or decrease the amount of slag in the slag layer and therefore control the heat loss via the side walls of the vessel.

The slag may form a "wet" layer or a "dry" layer on the side walls. A "wet" layer comprises a frozen layer that adheres to the side walls, a semi-solid (mush) layer, and an outer liquid film. A "dry" layer is one in which substantially all of the slag is frozen.

The amount of slag in the slag layer also provides a measure of control over the extent of post combustion.

Specifically, if the slag inventory is too low there will be increased exposure of metal in the slag layer and therefore increased oxidation of metal and dissolved carbon in metal and the potential for reduced post-combustion, notwithstanding the positive effect the metal in the slag layer has on heat transfer to the metal layer.

In addition, if the slag inventory is too high the one or more than one oxygen-containing gas injection lance/tuyers that inject oxygen-containing gas into the top space will be buried in the slag layer and this reduces movement of top space reaction gases to the end of the or each lance/tuyers and, as a consequence, reduces potential for post-combustion.

The amount of slag in the vessel, ie the slag inventory, measured in terms of the depth of the slag layer or the weight ratio of metal:slag, may be controlled by the tapping rates of metal and slag.

The production of slag in the vessel may be controlled by varying on the feed rates of metalliferous feed material, carbonaceous material, and fluxes to the vessel and operating parameters such as oxygen-containing gas injection rates.

In situations where the process is concerned with producing molten iron, preferably the process includes controlling the level of dissolved carbon in molten iron to be at least 3 wt % and maintaining the slag in a strongly reducing condition leading to FeO levels or less than 6 wt %, more preferably less than 5 wt %, in the slag layer and in the expanded molten bath zone.

The metalliferous feed material may be in any suitable form. For example, it may be in the form of ores, partly reduced ores, DRI (direct reduced iron), iron carbide, millscale, blast furnace dust, sinter fines, BOF dust or a mixture of such materials.

In the case of partly reduced ores, the degree of pre-reduction may range from relatively low levels (eg to FeO) to relatively high levels (eg 70 to 95% metallisation).

In this connection, the process further includes partly reducing metalliferous ores and thereafter injecting the partly reduced ores into the metal layer.

The metalliferous feed material may be pre-heated.

The carrier gas may be any suitable carrier gas.

It is preferred that the carrier gas be an oxygen-deficient gas.

It is preferred that the carrier gas comprise nitrogen.

According to the present invention there is provided a vessel which produces metal from metalliferous feed material by the above-described direct smelting process, which vessel contains a molten bath having a metal layer and a slag layer on the metal layer and a gas continuous top space above the slag layer, which vessel includes:
(a) a hearth having a base and sides in contact with the molten metal;
(b) side walls which extend upwardly from the sides of the hearth and are i contact with the slag layer and the top space;

(c) a plurality of lances/tuyeres extending downwardly and injecting metalliferous feed material and carbonaceous material with a carrier gas into the molten bath so as to penetrate the metal layer and to create a region of turbulence at least at the interface between the metal layer and the slag layer; and (d) a plurality of lances/tuyeres injecting a gas into the slag layer so as to generate turbulence in an upper region of the slag layer.

Preferably, the solid material/carrier gas injection lances/tuyeres of item (c) above are at an angle of 30–60° to the vertical.

Preferably, the gas injection lances/tuyeres of item (d) above are at an angle in the range of minus 20° to the horizontal (is upwards at an angle of up to 20° to the horizontal to plus 60° to the horizontal (ie downwards at an angle up to 60° to the horizontal). Consequently, this range of angles covers downward/inward injection and upward/inward injection of gas.

Preferably, the lances/tuyeres of items (c) and (d) extend through the side walls of the vessel.

Preferably the vessel further includes at least one lance/tuyers injecting an oxygen-containing gas into the top space and post combustion reaction gases in the top space and/or in the upper region of the slag layer.

BRIEF DESCRIPTION OF THE DRAWINGS

The present invention is described further by way of example with reference to FIG. 1, which is a vertical section through a metallurgical vessel illustrating in schematic form a preferred embodiment of the process of the present invention.

The following description is in the context of smelting iron ore to produce molten iron and it is understood that the present invention is not limited to this application and is applicable to any suitable metallic ores and/or concentrates—including partially reduced metallic ores and waste revert materials.

The vessel shown in the figure has a hearth that includes a base 3 and sides 55 formed from refractory bricks; side walls 5 which from a generally cylindrical barrel extending upwardly from the sides 55 of the hearth and which include an upper barrel section 51 and a lower barrel section 53; a roof 7; an outlet 9 for off-gases; a forehearth 57 for discharging molten metal continuously; and a tap-hole 61 for discharging molten slag.

In use, the vessel contains a molten bath of iron and slag which includes a layer 15 of molten metal and a layer 16 of molten slag on the metal layer 15. The arrow marked by the numeral 17 indicates the position of quiescent surface of the metal layer 15 and the arrow marked by the numeral 19 indicates the position of the quiescent surface of the slag layer 16. The term "quiescent surface" is understood to mean the surface when there is no injection of gas and solids into the vessel.

The vessel also includes a lower pair of injection lances/tuyeres 11 extending downwardly and inwardly at an angle of 30°–60° to the vertical through the side walls 5 and into the slag layer 16. The position of the lances/tuyeres 11 is selected so that the lower ends are above the quiescent surface 17 of the metal layer 15.

In use, iron ore (typically fines), solid carbonaceous material (typically coal), and fluxes (typically line and magnesia) entrained in a carrier gas (typically $N_2$) are injected into the metal layer 15 via the lances/tuyeres 11. The momentum of the solid material/carrier gas causes the solid material and the carrier gas to penetrate the metal layer 15. The coal is devolatilised and thereby produces gas in the metal layer 15. Carbon partially dissolves into the metal and partially remains as solid carbon. The iron ore is smelted to metal and the smelting reaction generates carbon monoxide gas. The gases transported into the metal layer 15 and generated via devolatilication and smelting produce significant buoyancy uplift of molten metal, solid carbon, and slag (drawn into the metal layer 15 as a consequence of solid/gas/injection) from the metal layer 15 which generates an upward movement of molten metal and slag into the layer 16.

The buoyancy uplift of molten metal, solid carbon and slag causes substantial agitation of the interface between the metal layer 15 and the slag layer 16, and creates a zone of high turbulence at least in this region.

The vessel further includes an upper pair of lances/tuyeres 41 extending downwardly and inwardly at an angle of 30°–60° from the vertical through the side walls 5 and into the slag layer 16.

In use, oxygen gas (and optionally solid and/or gaseous carbonaceous material and/or other gases) is injected into the slag layer 16 via the lances/tuyeres 41 and creates a zone of high turbulence in an upper region of the slag layer and causes splashes, droplets and streams of molten material to be projected from the slag layer into a top space 43 of the vessel.

The oxygen gas injection has a two-fold impact on the process. Firstly, the oxygen gas post-combusts any combustible reaction gases, such as CO and $H_3$, in this region of the slag layer 16 and thereby provides heat for the process. The high level of agitation in the slag layer 16 provides an effective means of transferring post-combustion heat to the metal layer 15. Secondly, the splashes, droplets and streams of molten material, which are at least predominantly slag, that are projected from the slag layer 16 contact the upper barrel section 51 and the roof of the vessel and form a protective layer that reduces heat loss from these sections of the vessel. The projected molten material also provides a mechanism for returning additional energy to the bath.

The extent of agitation in the above described zones of high turbulence is such that there is reasonably uniform temperature in the metal and the slag regions—typically, 1450–1550° C. with a temperature variation of the order of 30° C. in each region.

The vessel further includes a lance 13 for injecting an oxygen-containing gas (typically pre-heated oxygen enriched air) which is centrally located and extends vertically downwardly into the top space 43 of the vessel. The position of the lance 13 and the gas flow rate through the lance 13 are selected so that the oxygen-containing gas maintains an essentially metal/slag free space 25 around the end of the lance 13.

The injection of the oxygen-containing gas via the lance 13 post-combusts reaction gases CO and $H_3$ in the free space 25 around the end of the lance 13 and generates high temperatures of the order of 2000° C. or higher in the gas space. The heat is transferred to the metal layer 15 via the highly agitated slag layer 16 as described above.

The free space 25 is important to achieving high levels of post combustion because it enables entrainment of gases in the top space into the end region of the lance 13 and thereby increases exposure of available reaction gases to post combustion.

The combined effect of the position of the lance 13 in the top space 43, gas flow rate through the lance 13, and upward movement of splashes, droplets and streams of molten material from the slag layer 16 is to shape the molten material of the splashes, droplets, and streams around the lower region of the lance 13—generally identified by the numerals 27. This shaped region provides a partial barrier to heat transfer by radiation to the side walls 5.

In accordance with a preferred embodiment of the present invention the vessel is constructed with reference to the levels of the metal layer 15 and the slag layer 16 in the vessel when the process is operating so that:

(a) the hearth and the lower barrel section 53 of the side walls 5 that contact the melt/slag layers 15/16 are formed from bricks of refractory material (indicated by the cross-hatching in the figure).

(b) at least part of the lower barrel section 53 of the side walls 5 is backed by water cooled panels (not shown) and (c) an upper barrel section 51 of the side walls 5 and the roof 7 that contact the top space 31 are formed from water cooled panels (not shown).

Each water cooled panel of the side walls 5 has parallel upper and lower edges and parallel side edges and is curved so as to define a section of the cylindrical barrel. Each panel includes an inner water cooling pipe and an outer water cooling pipe. The pipes are formed into a serpentine configuration with horizontal straight sections interconnected by curved sections. Each pipe further includes a water inlet and a water outlet. The pipes are displaced vertically so that the straight sections of the outer pipe are not immediately behind the straight sections of the inner pipe when viewed from an exposed face of the panel, is the face that is exposed to the interior of the vessel. Each panel further includes a rammed refractory material which fills and spaces between the adjacent straight sections of each pipe and between the pipes. Each panel further includes a support plate which forms an outer surface of the panel.

The water inlets and the water outlets of the pipes are connected to a water supply circuit (not shown) which circulates water at high flow rate through the pipes.

In use, the water flow rate through the water cooled panels the solids/carrier gas flow rate via the lances/tuyeres 11, and the oxygen-containing gas flow rate via the lances 13, 41 are controlled so that there is sufficient slag contacting the panels and sufficient heat extraction from the panels to build-up and maintain a layer of frozen slag on the panels. The slag layer forms an effective thermal barrier which thereafter minimises heat loss to below 250 kW/m$^2$ from the side walls 5 and the roof 7 of the vessel.

Many modifications may be made to the preferred embodiment of the vessel described above without departing from the spirit and scope of the present invention.

In this connection, whilst the preferred embodiment includes injecting all of the metalliferous feed material into the metal layer, it is within the scope of the present invention to introduce a part of the metalliferous feed material in other regions of the vessel, for example, by gravity feed into the top space of the vessel.

In addition, whilst the preferred embodiment includes upper and lower pairs of lances/tuyeres 11, 41 which extend into the slag layer 16, the present invention is not so limited and extends to any suitable number of lances/tuyeres.

Furthermore, whilst the preferred embodiment includes injection of oxygen-containing gas via lance 13, the present invention is not so limited and oxygen-containing gas injection may be through the lances/tuyeres 41 only.

Furthermore, whilst the preferred embodiment includes injection of oxygen gas via lances/tuyeres 41, the present invention is not limited to injection of oxygen (or oxygen-containing gas) through these lances/tuyeres and extends to the injection of other gases in addition to or as alternatives to oxygen gas injection. The gases include inert gas and recycled off-gas.

Furthermore, whilst oxygen gas injection via the lances/tuyeres 41 creates the zone of high turbulence in the upper region of the slag layer in the above-described preferred embodiment, the present invention is not so limited and extends to methods in which the buoyancy uplift of molten material from the metal layer 15 contributes to turbulence in the upper region.

What is claimed is:

1. A direct smelting process for producing metals from metalliferous feed material which includes the steps of:

(a) forming a molten bath having a metal layer and a slag layer on the metal layer in a metallurgical vessel;

(b) injecting metalliferous feed material and solid carbonaceous material with a carrier gas into the molten bath via a first plurality of lances/tuyeres and smelting metalliferous material to metal in the metal layer;

(c) generating an upward gas flow from the metal layer which entrains molten material that is in the metal layer and carries the molten material into the slag layer and forms a region of turbulence at least at the interface of the slag layer and the metal layer; and (d) injecting a gas into the slag layer via a second plurality of lances/tuyeres and;

(i) penetrating turbulence in an upper region of the slag layer; and (ii) projecting splashes, droplets and streams of molten material from the slag layer into a top space of the vessel that is above the slag layer; and (e) post combusting reaction gases in the top space and/or in the upper region of the slag layer.

2. The process defined in claim 1 wherein the region of turbulence at the interface of the slag layer and the metal layer is a metal-rich region compared to other regions of the slag layer.

3. The process defined in claim 1 wherein the region of turbulence in the upper region of the slag layer is a slag-rich region compared to the region of turbulence at the interface of the slag layer and the metal layer.

4. The process defined in claim 1 wherein step (c) includes injecting metalliferous feed material and/or solid carbonaceous material and a carrier gas into the molten bath so that the solid material and the carrier gas penetrate the metal layer and generate the upward gas flow from the metal layer.

5. The process defined in claim 4 wherein at least 80 wt % of the metalliferous feed material supplied to the process is injected into the molten bath and penetrates the metal layer.

6. The process defined in claim 1 wherein the gas flow rate generated in step (c) is at least 0.04 Nm$^3$/S/m$^2$ area of the metal layer and the slag layer as measured under quiescent conditions.

7. The process defined in claim 1 wherein the gas that is injected into the slag layer in step (d) is selected from a group which includes an oxygen containing gas, an inert gas, such as nitrogen and an off-gas released from the vessel.

8. The process defined in claim 1 wherein step (d) includes injecting a carbonaceous material and an oxygen-containing gas into the slag layer.

9. The process defined in claim 1 wherein step (e) includes injecting an oxygen-containing gas into the top space via one or more than one lance/tuyere as a source of oxygen for post combusting reaction gases in the top space.

10. The process defined in claim 9 wherein the location and operating parameters of the one or more than one lance/tuyere are selected so that:

(a) the oxygen-containing gas is injected towards the slag layer; and (b) the stream of oxygen-containing gas deflects the upwardly projected splashes, droplets and streams of molten material around the lower section of the or each lance/tuyere and a gas continuous free space forms around the end of the or each lance/tuyere.

11. The process defined in claim 1 includes maintaining a relatively high slag inventory and using the amount of slag as a means of controlling the process.

12. A vessel which produces metal from metalliferous feed material by a direct smelting process, which vessel contains a molten bath having a metal layer and a slag layer on the metal layer and a gas continuous top space above the slag layer, which vessel comprises:

(a) a hearth having a base and sides in contact with the molten metal;

(b) side walls which extends upwardly from the sides of the hearth and are in contact with the slag layer and the top space;

(c) a first plurality of lances/tuyeres extending downwardly and a source of metalliferous feed material and carbonaceous material operably coupled to said first plurality of lances/tuyeres, such that said first plurality of tuyeres is operable to inject said materials, with a carrier gas, into the molten bath so as to penetrate the metal layer and to create a region of turbulence at least at the interface between the metal layer and the slag layer;

(d) a second plurality of lances/tuyeres and a source of gas operably coupled to said second plurality of lances/tuyeres, such that said second plurality of lances/tuyeres is operable to inject said gas into the slag layer so as to generate turbulence in an upper region of the slag layer; and (e) at least one gas lance/tuyere injecting an oxygen-containing gas into the top space and post combusting reaction gases in the top space and/or in the upper region of the slag layer.

13. The vessel defined in claim 12 wherein the first plurality of lances/tuyeres are at an angle of 30–60° to the vertical.

14. The vessel defined in claim 12 wherein the second plurality of lances/tuyeres are at an angle in the range of minus 20° to the horizontal to plus 60° to the horizontal.

15. The process defined in claim 2 wherein the region of turbulence in the upper region of the slag layer is a slag-rich region compared to the region of turbulence at the interface of the slag layer and the metal layer.

16. The vessel defined in claim 13 wherein the second plurality of lances/tuyeres are at an angle in the range of minus 20° to the horizontal to plus 60° to the horizontal.

* * * * *

UNITED STATES PATENT AND TRADEMARK OFFICE
CERTIFICATE OF CORRECTION

PATENT NO. : 6,368,548 B1
DATED : April 9, 2002
INVENTOR(S) : John Alexander Innes It is certified that error appears in the above-identified patent and that said Letters Patent is hereby corrected as shown below:

<u>Title page,</u>
Item "[30] Foreign Application Priority Data", the priority application number "0763" is corrected to -- PQ0763 --.

ABSTRACT,
Line 8, "slay" is corrected to -- slag --.

<u>Column 10,</u>
Line 29, the term "penetrating" is corrected to -- generating --.
Line 22, the term "extends" is corrected to -- extend --.

Signed and Sealed this

Twenty-fifth Day of June, 2002

Attest:

Attesting Officer

JAMES E. ROGAN
Director of the United States Patent and Trademark Office